(12) United States Patent
Crasso et al.

(10) Patent No.: US 10,229,140 B2
(45) Date of Patent: Mar. 12, 2019

(54) EXTENSIBLE INDEXING SYSTEM EVALUATION AND RECOMMENDATION

(71) Applicant: International Business Machines Corporation, Armonk, NY (US)

(72) Inventors: Marco P. Crasso, Buenos Aires (AR); Ru Fang, Beijing (CN); Anshu N. Jain, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 367 days.

(21) Appl. No.: 14/754,719

(22) Filed: Jun. 30, 2015

(65) Prior Publication Data

US 2017/0004155 A1   Jan. 5, 2017

(51) Int. Cl.
*G06F 17/30* (2006.01)
*G06F 11/34* (2006.01)

(52) U.S. Cl.
CPC .... *G06F 17/30312* (2013.01); *G06F 11/3414* (2013.01); *G06F 11/3428* (2013.01); *G06F 11/3452* (2013.01); *G06F 17/30333* (2013.01)

(58) Field of Classification Search
CPC ......... G06F 17/30336; G06F 17/30333; G06F 11/3428; G06F 11/3409; G06F 17/30312; H04L 41/0681; H04L 43/08; G06Q 10/0639; G05B 13/024
See application file for complete search history.

(56) References Cited

U.S. PATENT DOCUMENTS

| 5,926,813 | A | 7/1999 | Chaudhuri et al. |
| 5,950,186 | A * | 9/1999 | Chaudhuri ........ G06F 17/30312 |
| 5,960,423 | A * | 9/1999 | Chaudhuri ........ G06F 17/30312 707/715 |
| 7,020,654 | B1 | 3/2006 | Najmi |
| 7,499,907 | B2 * | 3/2009 | Brown .............. G06F 17/30336 |
| 7,672,928 | B2 | 3/2010 | Maloney et al. |
| 8,046,366 | B1 | 10/2011 | Perrin et al. |
| 8,171,459 | B2 * | 5/2012 | Oja ..................... G06F 11/3612 717/124 |

(Continued)

FOREIGN PATENT DOCUMENTS

WO    2010129063 A1    11/2010

OTHER PUBLICATIONS

Iman Elghandour, Ashraf Aboulnaga, Daniel C. zilio, Fei Chiang, Andrey Balmin, Kevin Beyer, Calisto Zuzarte, "XML Index Recommendation with Tight Optimizer Coupling", 2008, pp. 833-842.*

(Continued)

*Primary Examiner* — Merilyn P Nguyen
(74) *Attorney, Agent, or Firm* — Mollborn Patents, Inc.; Fredrik Mollborn (57) ABSTRACT

Methods and apparatus, including computer program products, implementing and using techniques for evaluating indexing systems. Comparative tests are performed on two or more indexing systems. Each test uses one or more of: benchmarks, metrics, estimates of input data, desired index configuration, and performance constraints. A recommendation is automatically provided for an indexing system and an optimal configuration of the indexing system is also provided, based on an evaluation metrics from the tests.

17 Claims, 9 Drawing Sheets

(56) References Cited

U.S. PATENT DOCUMENTS

| | | | | |
|---|---|---|---|---|
| 8,499,001 | B1* | 7/2013 | To | G06F 19/28 |
| | | | | 707/741 |
| 8,606,800 | B2 | 12/2013 | Lagad et al. | |
| 9,418,092 | B2* | 8/2016 | Morris | G06F 17/30312 |
| 2010/0174701 | A1* | 7/2010 | Burger | G06F 17/30312 |
| | | | | 707/713 |
| 2013/0173573 | A1 | 7/2013 | Song et al. | |
| 2014/0019807 | A1* | 1/2014 | Harrison | G06N 5/02 |
| | | | | 714/37 |
| 2015/0046251 | A1* | 2/2015 | Smith | G06Q 30/0242 |
| | | | | 705/14.41 |
| 2017/0124628 | A1* | 5/2017 | Kirkby | G06Q 30/0631 |

OTHER PUBLICATIONS

Huang, et al; "The HiBench Benchmark Suite: Characterization of the MapReduce-Based Data Analysis"; Institute of Electrical and Electronics Engineers. 2010. 11 pp.

Jensen, et al; "The COST Benchmark—Comparison and Evaluation of Spatio-temporal Indexes"; DASFAA 2006, LNCS 3882, pp. 125-140, 2006. c Springer-Verlag Berlin Heidelberg 2006. 16 pp.

Scholer, et al; "Compression of Inverted Indexes for Fast Query Evaluation" SIGIR'02, Aug. 11-15, 2002, Tampere, Finland. pp. 222-229.

Zobel, et al; "Guidelines for Presentation and Comparison of Indexing Techniques"; SIGMOD Record, vol. 25, No. 3, Sep. 1996. pp. 10-15.

\* cited by examiner

Example:

| | Avg Ingestion Time | Avg Query Resp Time | Avg Mem Util | Avg CPU Util |
|---|---|---|---|---|
| Index Config 1 | 2.26 minutes / GB | 1.019 seconds | 3.40% | 4.60% |
| Index Config 2 | 1.72 minutes / GB | 1.326 seconds | 1.60% | 4.20% |
| Index Config 3 | 2.30 minutes / GB | 1.226 seconds | 2.80% | 4.50% |

Ranked Recommendtion Based on Net Score:
1. Index Config 2: 0.8
2. Index Config 1: 0.6
3. Index Config 3: 0.4

Recommendation for individual Metrics :
By Avg Ingestion Response Time:
  Index Config 2 > Index Config 1 > Index Config 3
By Avg Query Response Time:
  Index Config 1 > Index Config 3 > Index Config 2
By Avg Memory Util:
  Index Config 2 > Index Config 3 > Index Config 1

FIG. 9

EXTENSIBLE INDEXING SYSTEM EVALUATION AND RECOMMENDATION

BACKGROUND

The present invention relates to computer-based searches, and more specifically, to indexing systems. A search engine is an information retrieval system that is designed to find data on either the Internet or an intranet. Indexing forms an important part of a search engine, since the index describes how to store the data in a way that facilitates fast and accurate information look-up.

Currently, both Web data and enterprise data grow rapidly and massively. As a result, the scalability, reliability, performance, query capability and merge factor have become critical for indexing systems. Some of the most popular indexing systems for supporting big data search and analysis today include, for example, rational database indexes and inverted indexes.

Indexing systems allow different ways to configure how data should be indexed, to allow searching on specific datum or faceting certain results over others. This is generally referred as "schema configuration" and has a direct impact on the overall performance of the search process. Another important configuration asset is the target architecture, e.g. using one or more nodes for holding the indexes.

As the skilled person realizes, deciding which indexing system, which schema configuration, and how many nodes are the most appropriate for a dataset, is a challenging task. There are already a few popular indexing systems that accept different schema configurations and offer different application program interfaces (APIs). It is still difficult to evaluate, measure and select an appropriate indexing system for different type of data and queries.

Some of the key challenges include:
Capacity planning for a specific type of indexing system always has many options, and to evaluate these different options is complex and time-consuming work.
How to easily measure performance and query capacity for an indexing system.
How to evaluate different types of schema configuration in an indexing system.
How to evaluate different hardware configurations in an indexing system.
How to recommend specific configuration option for a given dataset description.
How to easily perform existing benchmark to different types of indexing system.
Some of the drawbacks of existing solutions include:
They only run on query performance tests
They can only run benchmark tests for a specific type of indexing system
They cannot compare different configuration plans for an indexing system
They cannot compare different types of indexes
They cannot recommend appropriate configurations based on a dataset description Thus, there is a need for improved techniques for discovering and evaluating indexing systems.

SUMMARY

According to one embodiment of the present invention, methods, systems and computer program products are provided for evaluating indexing systems. Comparative tests are performed on two or more indexing systems. Each test uses one or more of: benchmarks, metrics, estimates of input data, desired index configuration, and performance constraints. A recommendation is automatically provided for an indexing system and an optimal configuration of the indexing system is also provided, based on an evaluation metrics from the tests.

The details of one or more embodiments of the invention are set forth in the accompanying drawings and the description below. Other features and advantages of the invention will be apparent from the description and drawings, and from the claims.

BRIEF DESCRIPTION OF THE SEVERAL VIEWS OF THE DRAWINGS

Like reference symbols in the various drawings indicate like elements.

DETAILED DESCRIPTION

The various embodiments of the invention pertain to techniques for evaluating different indexing systems in accordance with customized benchmarks and metrics. Given a group of benchmarks, different capacity plans and data schema configurations are tested on different indexing systems. Based on the results of the tests, an indexing system and configurations for the indexing system are recommended. In some embodiments, a set of APIs (Application Program Interfaces) are provided, which enable a user to extend the current evaluation system, including plug-in benchmarks, index configurations and metrics.

A number of advantages can be achieved with a system in accordance with the various embodiments of the invention described herein. For example, it may reduce the time and cost associated with evaluating different capacity plans and provide recommendations for a specific indexing system, perform query performance tests on different types of indexing systems, and evaluate different data schema configurations for an indexing system. By providing and implementing the extended APIs, this framework and system can be extended to evaluate any type of indexing system.

Figure 1:
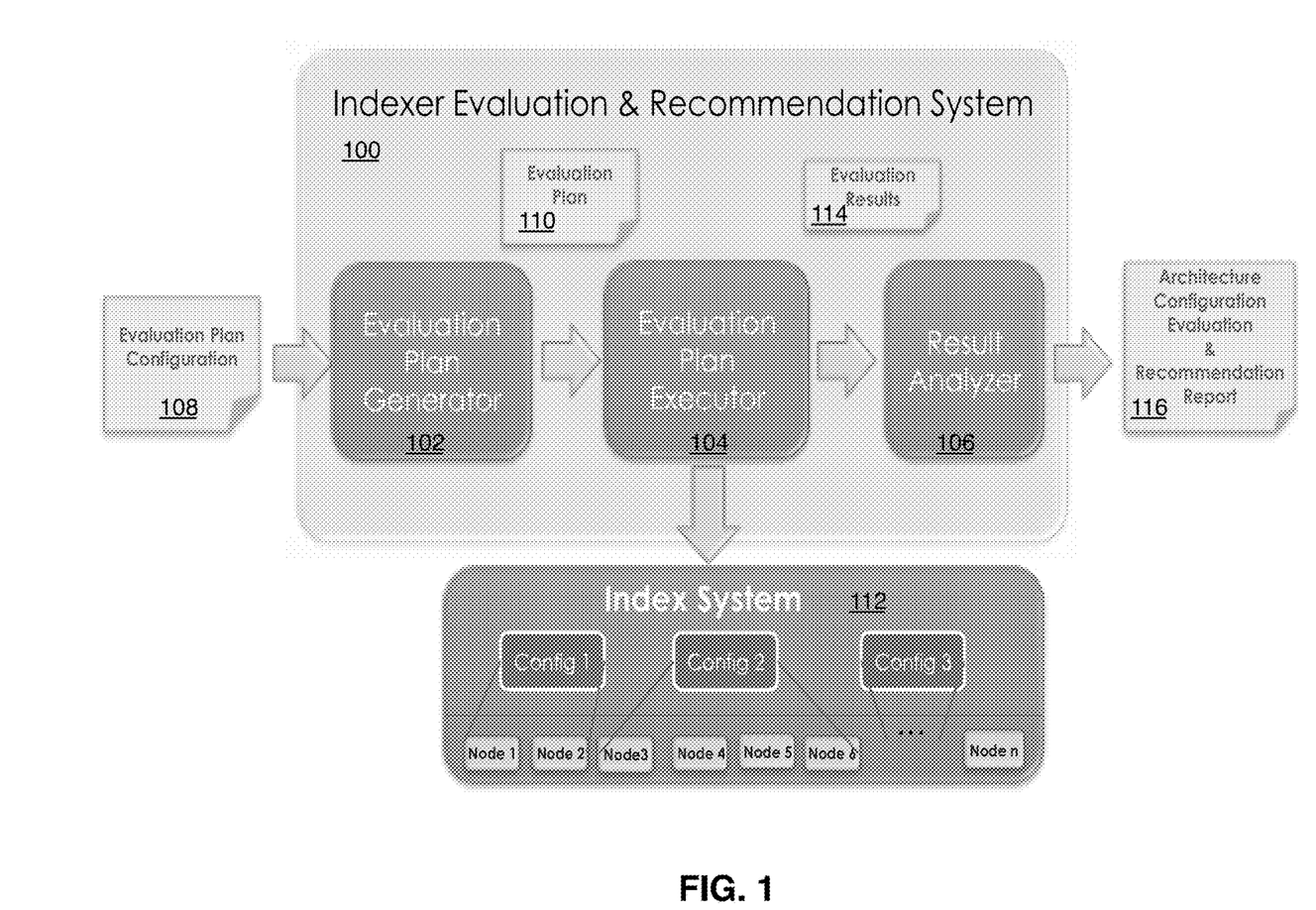
FIG. 1 shows a schematic view of an indexing evaluation and recommendation system, in accordance with one embodiment.

FIG. 1 shows a schematic view of an index evaluation and recommendation system (100) in accordance with one embodiment. As can be seen in FIG. 1, the system (100) includes an evaluation plan generator (102), an evaluation plan executor (104) and a result analyzer (106). The evaluation plan generator (102) receives an evaluation plan configuration (108) and generates an evaluation plan (110), which will be described in detail below, and sends the evaluation plan (110) to the evaluation plan executor (104). The evaluation plan executor (104) evaluates various indexing system configurations (112) and creates a report (114) with the results of the evaluation. The report (114) is sent to the result analyzer (106), which produces an architecture configuration evaluation and recommendation report (116) that can be used to configure the indexing system.

Figure 2:
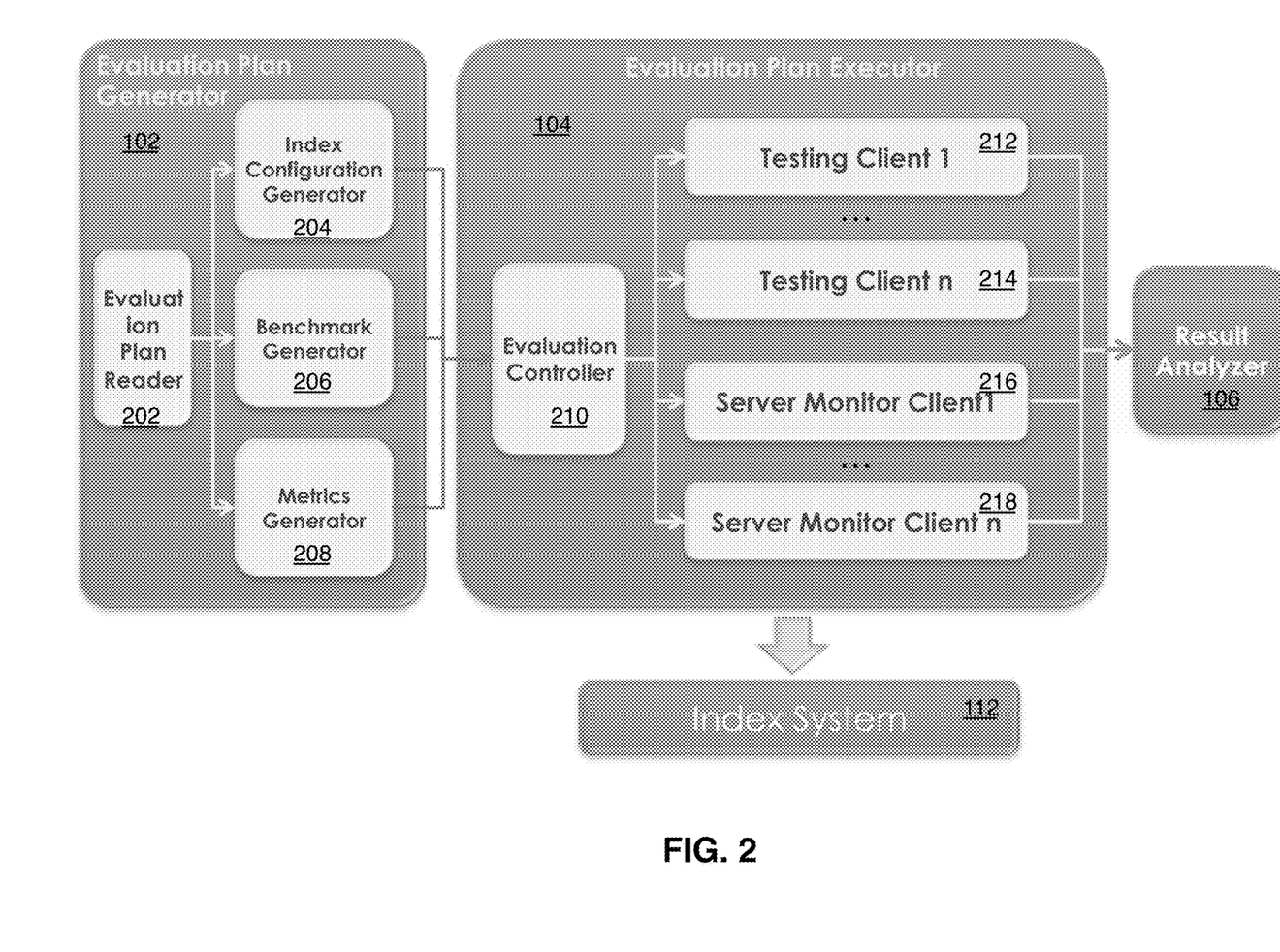
FIG. 2 shows a more detailed view of the indexing system of FIG. 1.

FIG. 2 shows a more detailed view of the evaluation plan generator (102) and the evaluation plan executor (104) in accordance with one embodiment. As can be seen in FIG. 2, the evaluation plan generator (102) includes an evaluation plan reader (202), an index configuration generator (204), a benchmark generator (206) and a metrics generator (208). The evaluation plan executor (104) includes an evaluation controller (210), a number of testing clients (212, 214) and a number of server monitor clients (216, 218). The operation of all of these components will now be described in further detail and with reference to FIG. 3, which shows an evaluation process (300) in accordance with one embodiment.

Figure 3:
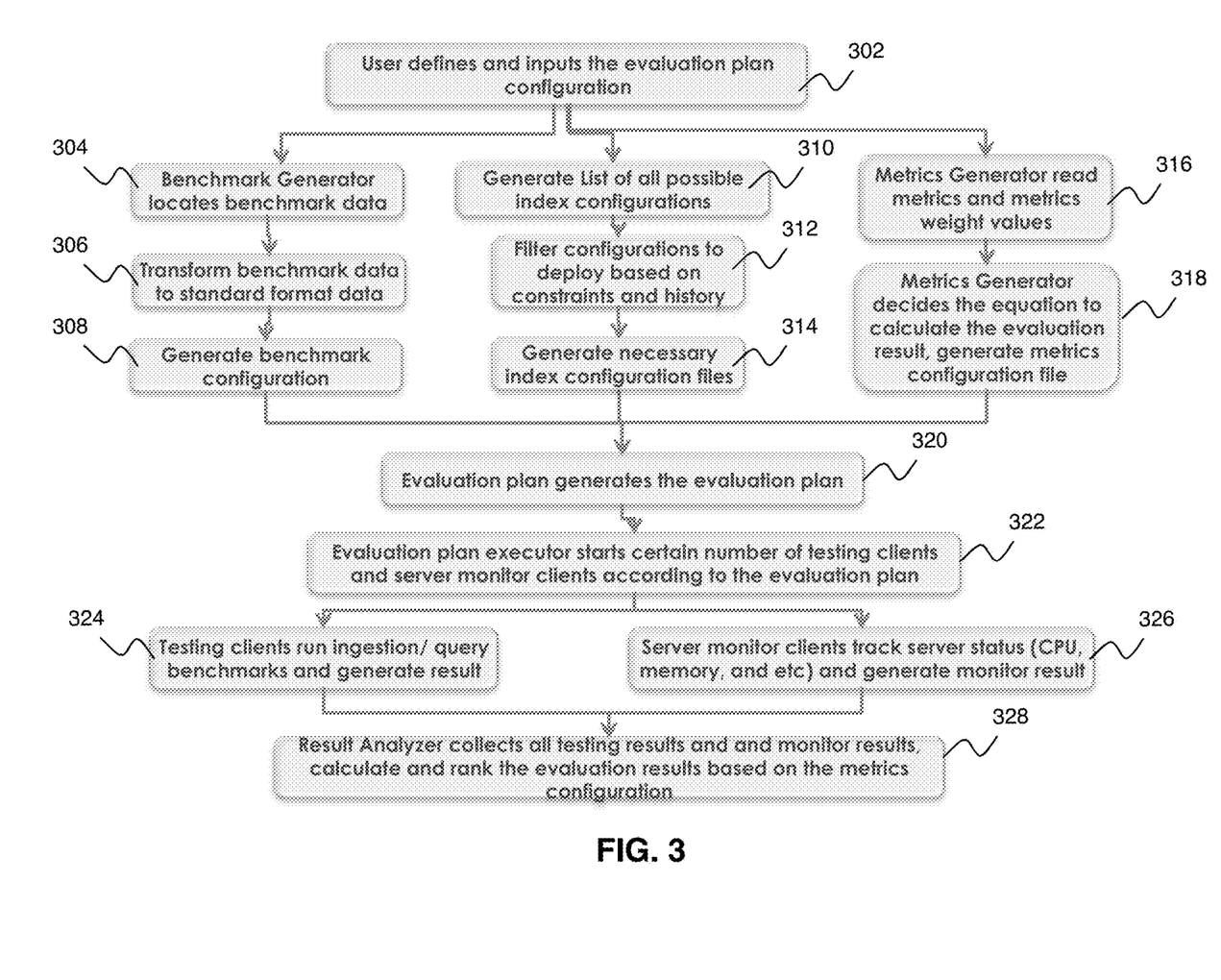
FIG. 3 shows a schematic flowchart of an indexing evaluation process, in accordance with one embodiment.
Figure 4:
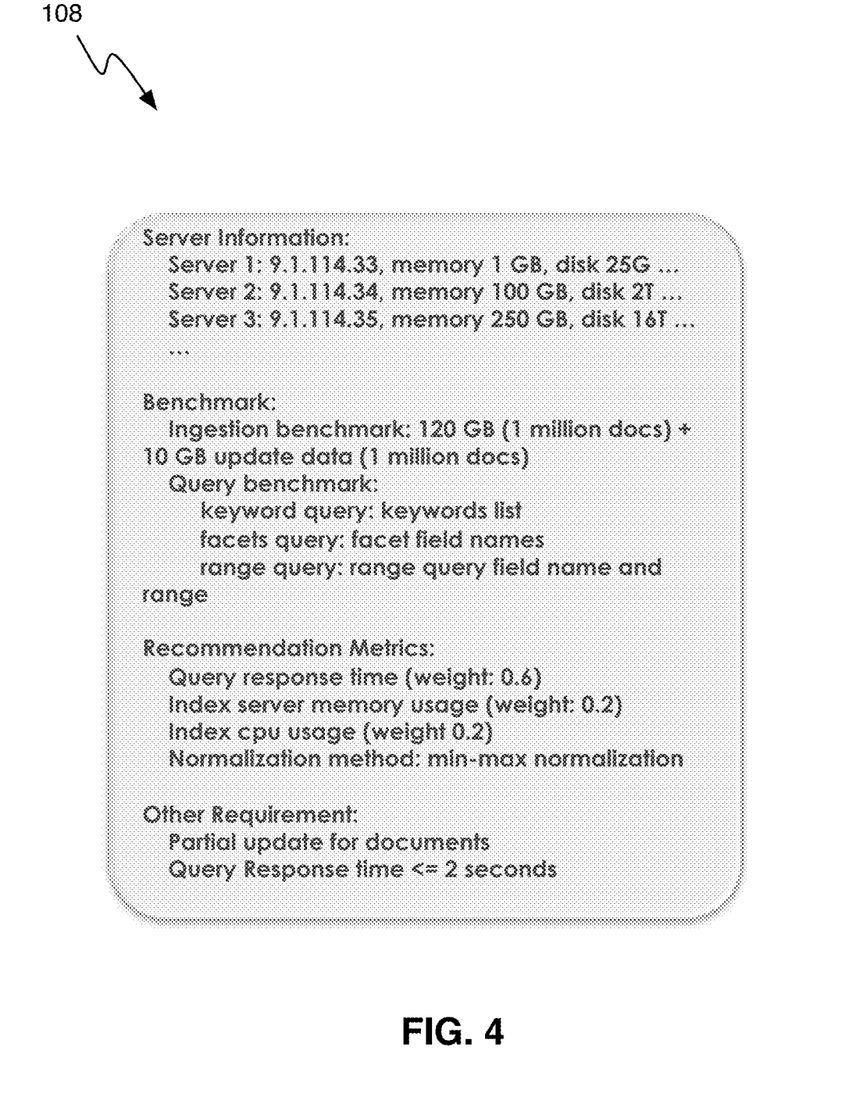
FIG. 4 shows an example of an evaluation plan configuration, in accordance with one embodiment.

As can be seen in FIG. 3, the evaluation process (300) begins with a user defining and inputting an evaluation plan configuration (108) (step 302). One example of an evaluation plan configuration (108) is shown in FIG. 4. As can be seen in FIG. 4, the evaluation plan configuration (108) contains items, such as server information (addresses, memory, etc.), benchmarks (for ingestion, queries, etc.), recommendation metrics (weighted values for equerry response time, index server memory usage, index CPU usage, and normalization method), as well as other requirements (e.g., query response time, etc.).

Figure 5:
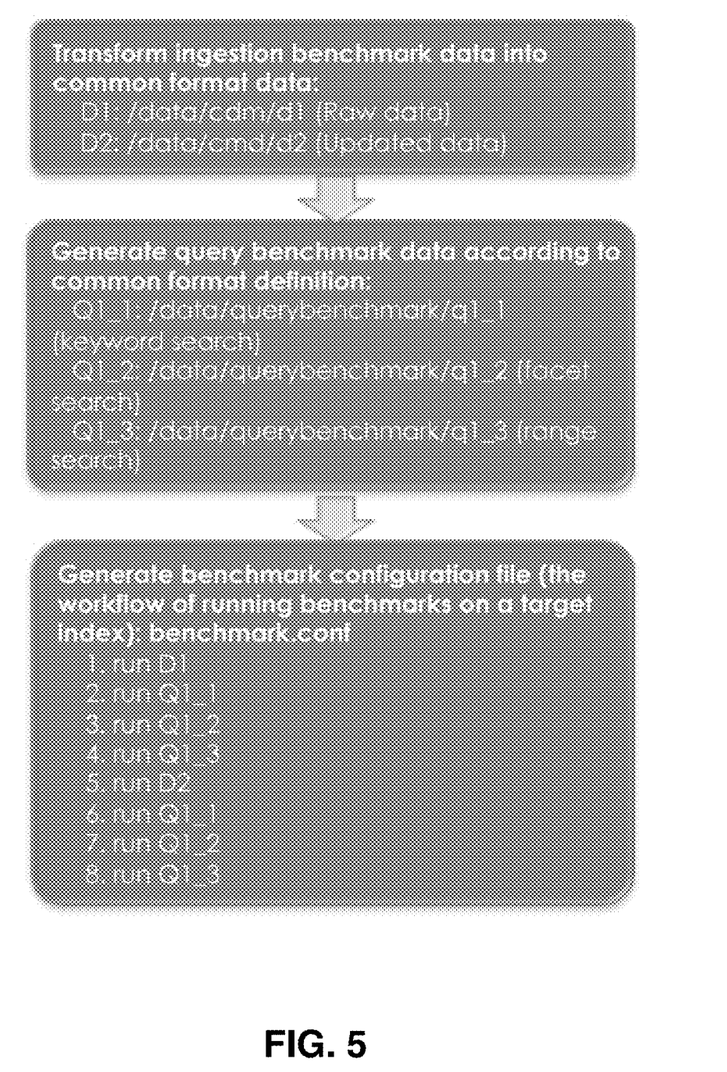
FIG. 5 shows a set of operations performed by the benchmark generator, in accordance with one embodiment.

When received by the evaluation plan generator (102), the benchmark generator (206), the index configuration generator (204) and the metrics generator (208) perform a series of steps in parallel. It should however be noted that in some embodiments, some of these steps may occur serially, and that various aspects of the benchmark generator (206), the index configuration generator (204) and the metrics generator (208) can be combined such that the steps are not necessarily performed by three separate generators. In the embodiment illustrated in FIG. 3, the benchmark generator (206) locates the benchmark data (step 304) in the evaluation plan configuration (108), transforms the benchmark data into a standard format (step 306), and generates a benchmark configuration (step 308). This is schematically illustrated in FIG. 5.

Figure 6:
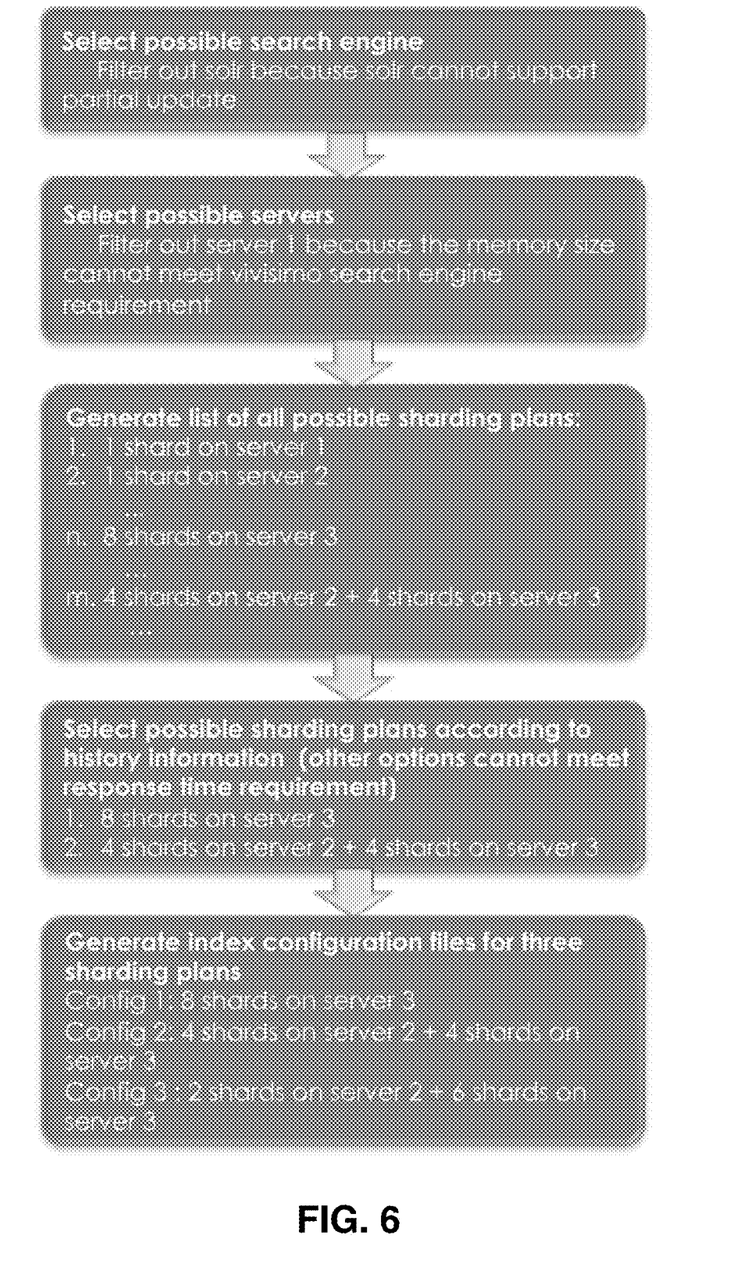
FIG. 6 shows a set of operations performed by the index configuration generator, in accordance with one embodiment.

The index configuration generator (204) generates a list of all possible index configurations (step 310), filters configurations to be deployed based on constraints and history (step 312), and generates the necessary index configuration files (step 314). This is schematically illustrated in FIG. 6.

Figure 7:
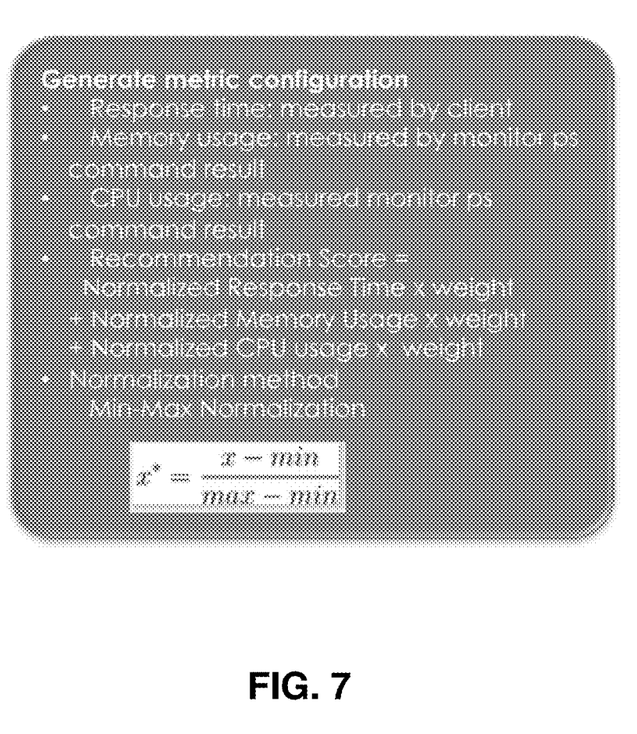
FIG. 7 shows a metrics configuration, in accordance with one embodiment.

The metrics generator (208) reads metrics and metrics weight values from the evaluation plan configuration (108) (step 316) and decides the equation to calculate the evaluation result and generate metrics configuration file (step 318). This is schematically illustrated in FIG. 7.

Based on the benchmark configuration generated in step 308, the index configuration files generated in step 314, and the metrics configuration file generated in step 318, the evaluation plan generator (102) generates the evaluation plan (110) (step 320), which is ingested by the evaluation plan executor (104).

Figure 8:
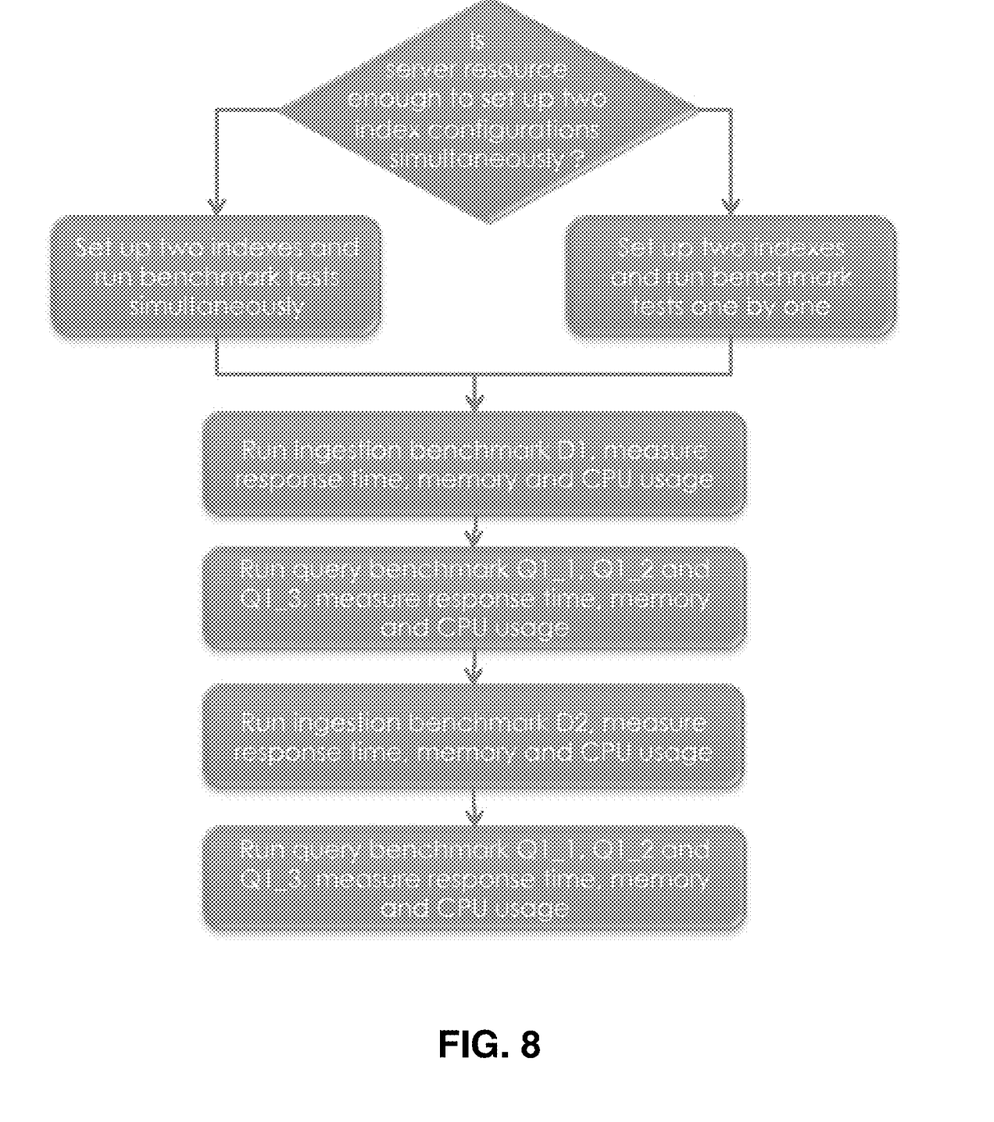
FIG. 8 shows an example workflow of the evaluation plan executor, in accordance with one embodiment.

The evaluation plan executor (104) starts a certain number of testing clients (212, 214) and server monitor clients (216, 218) according to the evaluation plan (step 322). The evaluation plan executor (104) then lets the test clients (212, 214) run the ingestion/query benchmarks and generate the test results (step 324). At the same time, the server monitor clients (216, 218) track the server status (CPU, memory, etc.) and generates monitor results (step 326). These steps are schematically illustrated in FIG. 8.

Figure 9:
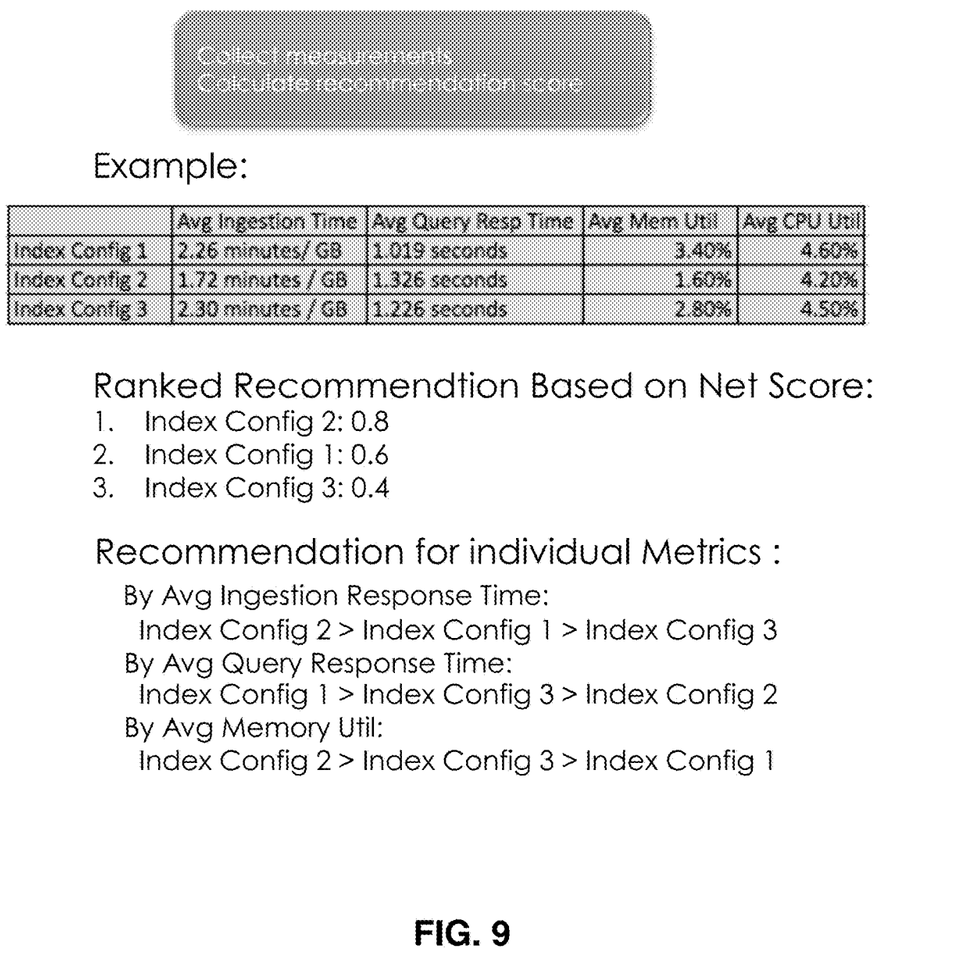
FIG. 9 shows an output from the result analyzer, in accordance with one embodiment.

Finally, the result analyzer (106) collects all test results and monitor results and calculates and ranks the evaluation results based on the metrics configuration determined in step 318 (step 328). This ends the process (300). FIG. 9 shows a schematic illustration of an architecture configuration evaluation and recommended report (116) in accordance with one embodiment. As can be seen in FIG. 9, the report lists the measured results and provides a ranked recommendation based on the net score, which is a composite score derived from the individually measured parameters. The report illustrated in FIG. 9 also includes a ranked recommendation based on individual metrics, such as average ingestion response time, average query response time, and average memory use.

The various embodiments described herein also provide a number of extended APIs as plug-ins, which allow users to plug in new types of indexes, benchmarks, and/or metrics in a simple manner. Some of these APIs include:

addIndexConfiguration( ): The input of this method is a set of key-value pairs, which define the index configuration parameters (name:type). This method can be used to implement the generation of necessary index configuration files.

runQuery( ): The input to this method is the benchmark configuration and index configuration. Though these two configurations, the system can locate the benchmark data and index. The output is the Query Result class that includes all the required metric information.

runIngestion( ): The input to this method is the is the benchmark configuration and index configuration. The output is the Ingestion Result class that has all the required metric information.

addBenchmarkConfig( ): The input of this method is a set of key-value pairs, which define benchmark configuration parameters (name:type). This method can be used to implement the generation of standard format of data from the input type of benchmark data.

addMetric( ): The input of this method is a set of key-value pairs, which define the necessary metric configuration parameters (name:type). This method can be used to implement monitoring of the corresponding status, and to normalize the status result.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for evaluating indexing systems, comprising:
  in response to receiving an evaluation plan configuration, the evaluation plan configuration including server information, benchmarks, and recommendation metrics, generating, by an evaluation plan generator, an evaluation plan containing a list of possible index configurations;
  performing, by an evaluation plan executor, comparative tests of the possible index configurations on a number of testing clients and server monitor clients in accordance with the evaluation plan, wherein each test uses one or more of: the benchmarks, the recommendation metrics, estimates of input data, desired index configuration, and performance constraints; and
  automatically providing, by a result analyzer, a ranked recommendation of indexing systems and optimal configurations of the indexing systems, wherein the ranked recommendation is determined based on an evaluation of metrics obtained in the comparative tests and the recommendation metrics in the evaluation plan configuration.

2. The method of claim 1, further comprising:
reducing a number of comparative tests based on received user input.

3. The method of claim 1, wherein performing comparative tests includes:
automatically deploying a test configuration for each comparative test in a pool of computing resources prior to performing the comparative tests.

4. The method of claim 3, wherein the test configurations are deployed iteratively.

5. The method of claim 3, wherein the test configurations are deployed in parallel.

6. The method of claim 1, further comprising:
monitoring system parameters while performing the comparative tests; and
storing results of the monitoring for comparative analysis.

7. The method of claim 1, wherein the ranked recommendation is a ranked recommendation of optimal architectures to deploy in a production environment.

8. The method of claim 7, further comprising:
recomputing a ranking based on one or more parameters input by a user; and
providing a revised ranked recommendation for the indexing system and a new optimal configuration of the indexing system.

9. A computer program product for evaluating indexing systems, the computer program product comprising a computer readable storage medium having program instructions embodied therewith, wherein the computer readable storage medium is not a transitory signal per se, the program instructions being executable by a processor to cause the processor to perform a method comprising:
in response to receiving an evaluation plan configuration, the evaluation plan configuration including server information, benchmarks, and recommendation metrics, generating, by an evaluation plan generator, an evaluation plan containing a list of possible index configurations;
performing, by an evaluation plan executor, comparative tests of the possible index configurations on a number of testing clients and server monitor clients in accordance with the evaluation plan, wherein each test uses one or more of: the benchmarks, the recommendation metrics, estimates of input data, desired index configuration, and performance constraints; and
automatically providing, by a result analyzer, a ranked recommendation of indexing systems and optimal configurations of the indexing systems, wherein the ranked recommendation is determined based on an evaluation of metrics obtained in the comparative tests and the recommendation metrics in the evaluation plan configuration.

10. The computer program product of claim 9, wherein the method further comprises:
reducing a number of comparative tests based on received user input.

11. The computer program product of claim 9, wherein performing comparative tests includes:
automatically deploying a test configuration for each comparative test in a pool of computing resources prior to performing the comparative tests.

12. The computer program product of claim 11, wherein the test configurations are deployed iteratively.

13. The computer program product of claim 11, wherein the test configurations are deployed in parallel.

14. The computer program product of claim 9, wherein the method further comprises:
monitoring system parameters while performing the comparative tests; and
storing results of the monitoring for comparative analysis.

15. The computer program product of claim 9, wherein the ranked recommendation is a ranked recommendation of optimal architectures to deploy in a production environment.

16. The computer program product of claim 15, wherein the method further comprises:
recomputing a ranking based on one or more parameters input by a user; and
providing a revised ranked recommendation for the indexing system and a new optimal configuration of the indexing system.

17. A system for evaluating indexing systems, comprising:
a processor; and
a memory, the memory containing program instructions that when executed by the processor causes the processor to perform a method comprising:
in response to receiving an evaluation plan configuration, the evaluation plan configuration including server information, benchmarks, and recommendation metrics, generating, by an evaluation plan generator, an evaluation plan containing a list of possible index configurations;
performing, by an evaluation plan executor, comparative tests of the possible index configurations on a number of testing clients and server monitor clients in accordance with the evaluation plan, wherein each test uses one or more of: the benchmarks, the recommendation metrics, estimates of input data, desired index configuration, and performance constraints; and
automatically providing, by a result analyzer, a ranked recommendation of indexing systems and optimal configurations of the indexing systems, wherein the ranked recommendation is determined based on an evaluation of metrics obtained in the comparative tests and the recommendation metrics in the evaluation plan configuration.

* * * * *